(12) United States Patent
Preston

(10) Patent No.: US 6,885,611 B2
(45) Date of Patent: Apr. 26, 2005

(54) METHOD FOR HIGH-PASS FILTERING FOR ECHO PROCESSING IN TIME OF FLIGHT RANGING SYSTEMS

(75) Inventor: Nigel Ashley Preston, Peterborough (CA)

(73) Assignee: Siemens Milltronics Process Instruments Inc., Peterborough (CA)

( * ) Notice: Subject to any disclaimer, the term of this patent is extended or adjusted under 35 U.S.C. 154(b) by 0 days.

(21) Appl. No.: 10/674,870

(22) Filed: Sep. 29, 2003

(65) Prior Publication Data

US 2004/0179429 A1 Sep. 16, 2004

(30) Foreign Application Priority Data

Sep. 27, 2002 (CA) .............................................. 2405658

(51) Int. Cl.⁷ .............................................. G01S 15/00
(52) U.S. Cl. ....................................................... 367/98
(58) Field of Search ............................. 367/98, 99, 908; 702/17, 190, 191, 193, 194, 195

(56) References Cited

U.S. PATENT DOCUMENTS

2003/0033094 A1 * 2/2003 Huang ......................... 702/39

* cited by examiner

*Primary Examiner*—Daniel Pihulic
(74) *Attorney, Agent, or Firm*—Townsend and Townsend and Crew LLP

(57) ABSTRACT

A method and system for high-pass filtering to remove DC and/or low frequency components of a receive signal from the transducer of a level measurement system. In one embodiment, the method includes generating a maximum signal profile and a minimum signal profile for the receive signal, generating a midpoint reference signal from the maximum and minimum signal profiles and subtracting the midpoint reference signal from the receive signal to produce a filtered signal.

10 Claims, 5 Drawing Sheets

METHOD FOR HIGH-PASS FILTERING FOR ECHO PROCESSING IN TIME OF FLIGHT RANGING SYSTEMS

FIELD OF THE INVENTION

The present invention relates to level measurement systems, and more particularly to a method for high-pass filtering for echo processing in pulse-echo acoustic ranging and time of flight ranging systems.

BACKGROUND OF THE INVENTION

Pulse-echo ranging systems are widely used to recognize the presence of an object by measuring the time interval between the transmission of a sonic or electromagnetic pulse towards the object and the reception of reflected echo signals over a distance. Systems of this kind generally have a transducer serving the dual role of transmitting and receiving pulses, and a signal processor for detecting and calculating the position or range of the object based on the transit times of the transmitted and reflected signals.

The transducer employed in an acoustic pulse-echo ranging system typically includes an electro-mechanical vibrating element that functions as both a transmitter and a receiver. Using the same transducer for transmitting as well as receiving is advantageous because the transducer will exhibit the same resonance frequency and the same directional characteristics in both transmit and receive modes. In transmit mode, the transducer is excited with an input voltage signal, which results in the emission of a characteristic burst of, for example, acoustic energy. In receive mode, the reflected energy or echo pulse causes the resonator element to vibrate and generate a low amplitude electrical signal output.

A problem in pulse-echo ranging systems is the susceptibility of the transducer to decay or "ringing down" oscillations of the resonator element as a result of stored energy being released by the transducer after excitation. The ringing down problem tends to severely limit the sensitivity of the transducer to detect a true or actual echo pulse. This loss in sensitivity is particularly acute when the echo pulse has a low amplitude relative to the ring down pulses of the transducer, and also when the reflective surface (i.e. object) is close to the transducer. When the reflective surface is close to the transducer, an echo may be received within a short period of time and may be lost in the ringing down oscillations.

Accordingly, there remains a need for a method and system for determining echo distance that addresses the problem of ringing down oscillations.

BRIEF SUMMARY OF THE INVENTION

The present invention provides a method for high-pass filtering for echo processing in level measurement systems.

In a first aspect, the present invention provides a method and system for high-pass filtering to remove DC and low frequency components of a receive signal from the transducer of a level measurement system. In one embodiment, the method includes generating a maximum signal profile and a minimum signal profile for the receive signal, generating a midpoint reference from the maximum and minimum signal profiles and subtracting the midpoint reference from the receive signal to produce a filtered signal.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference will now be made to the accompanying drawings, which show, by way of example, an embodiment of the present invention, and in which.

DETAILED DESCRIPTION OF SPECIFIC EMBODIMENTS

Figure 1:
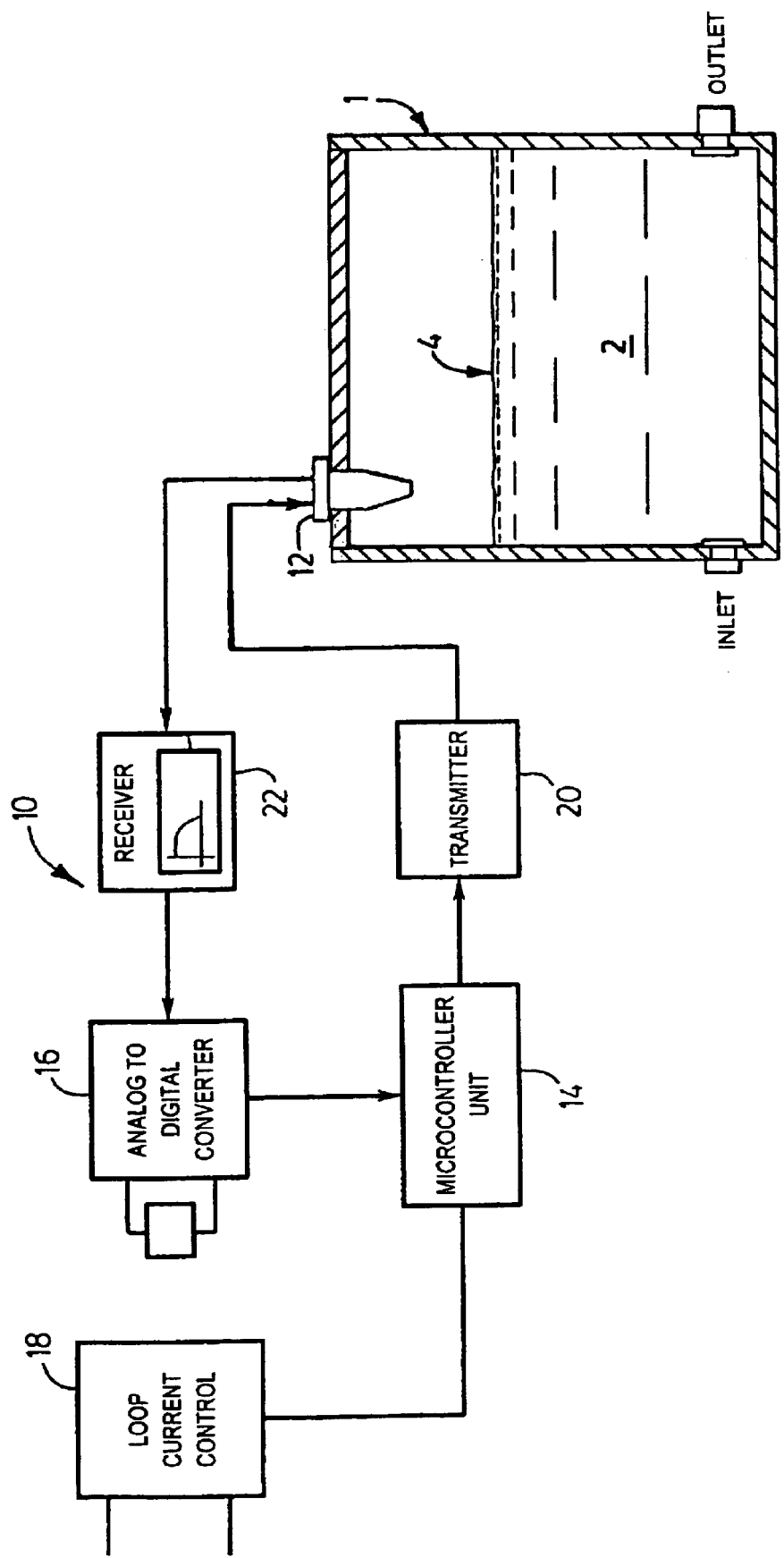
FIG. 1 shows in diagrammatic form a pulse-echo acoustic ranging device utilizing a pulse offset calibration technique according to the present invention.

Reference is first made to FIG. 1, which shows in diagrammatic form an ultrasonic pulse-echo acoustic ranging device 10 having high-pass filtering for echo processing according to the present invention.

As shown in FIG. 1, the pulse-echo acoustic ranging device 10 comprises an ultrasonic transducer 12, a microcontroller unit 14, an analog-to-digital converter 16, and a current (4–20 mA) loop interface module 18. The transducer 12 is coupled to the microcontroller unit 14 through a transmitter 20. The microcontroller unit 14 uses the transmitter stage 20 to excite the transducer 12 to emit ultrasonic pulses. Reflected or echo pulses are coupled by the transducer 12 and converted into a received electrical signal in a receiver stage 22.

The ultrasonic pulse-echo ranging device 10, i.e. the ultrasonic transducer 12, is installed in a tank 1 containing a liquid 2 with a level determined by the top surface of the liquid 2. The top surface of the liquid 2 provides a reflective surface or reflector, indicated by reference 4, which reflects the ultrasonic pulses generated from the emitter on the transducer 12. The reflected ultrasonic pulses are coupled by the transducer 12 and converted by the receiver 22 into electrical signals. The A/D converter 16 samples and digitizes the received signal to produce a sampled receive signal 102 (FIG. 2) for further processing by the microcontroller unit 14. The microcontroller unit 14 executes an algorithm which identifies and verifies the echo pulse and calculates the range of the reflective surface 4, i.e. the time it takes for the reflected ultrasonic pulse to travel from the reflective surface 4 to the receiver on the transducer 12. From this calculation, the distance to the surface of the liquid 4 and thereby the level of the liquid is determined. The microcontroller 14 also controls the transmission of data and control signals through the current loop interface 18. The microcontroller 14 is suitably programmed to perform these operations as will be within the understanding of those skilled in the art.

Figure 2:
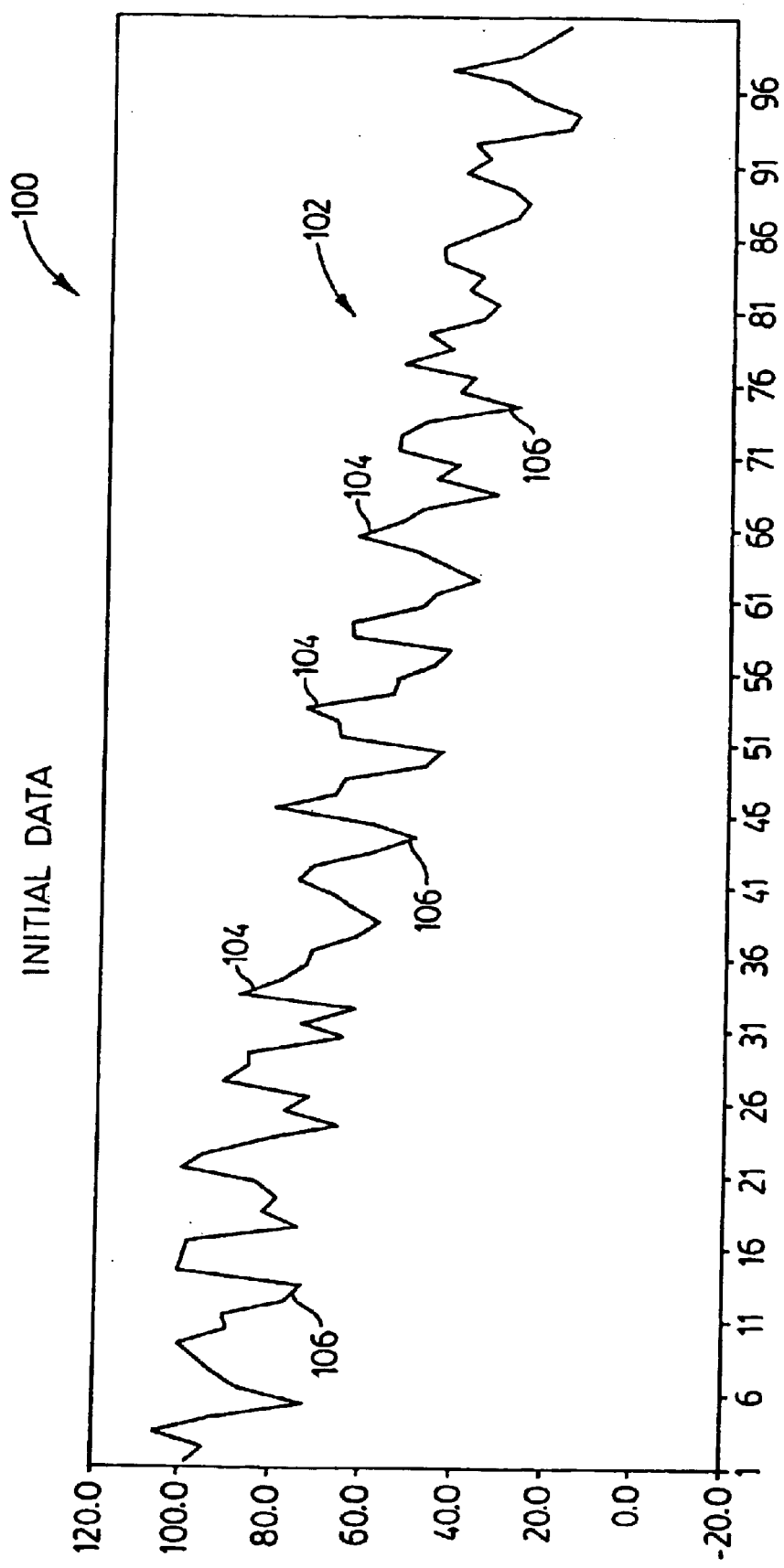
FIG. 2 shows a graph of the amplitude of a sampled receive signal over time.

Reference is now made to FIG. 2, which shows a graph 100 of the amplitude of the sampled receive signal 102 over time. Note that the sampled receive signal 102, as depicted in the graph 100, is a discrete signal defined by an amplitude value at each unit of time. In the embodiment described herein, the signal received by the microcontroller 14 from the A/D converter is a digital signal containing data representing the discrete signal.

As is depicted in the graph 100, the sampled receive signal 102 includes a plurality of peaks 104 and troughs 106. One or more of the peaks 104 may represent a echo of the transmitted pulse off of the reflective surface 4 (FIG. 1) that has been received by the transducer 12 (FIG. 1). Higher order echoes may also be present in the sampled receive signal 102 at later times. The higher order echoes are generated as the first-received echo pulse is reflected off the transducer 12 and back to the reflective surface 4, where it is again reflected back to the transducer 12.

It will be appreciated that not each of the peaks 104 shown in the graph 100 of the sampled receive signal 102 is necessarily a reflected pulse sensed by the transducer 12 (FIG. 1). Many of the peaks 104 and troughs 106 may result from ringing down in the transducer 12 or other system noise. Accordingly, the microprocessor 14 (FIG. 1) processes the sampled receive signal 102 following its digitization by the A/D converter 16 (FIG. 1), in order to identify the echo pulses.

The sampled receive signal 102 also exhibits a DC offset and a low frequency decay over time. In order to perform echo processing upon the receive signal 102, the microprocessor 14 under firmware program control first high-pass filters the sampled receive signal 102 to reduce or remove the DC and low frequency components. The suitable programming of the microprocessor 14 will be understood by one of ordinary skill in the art upon reviewing the functions described below.

Figure 3:
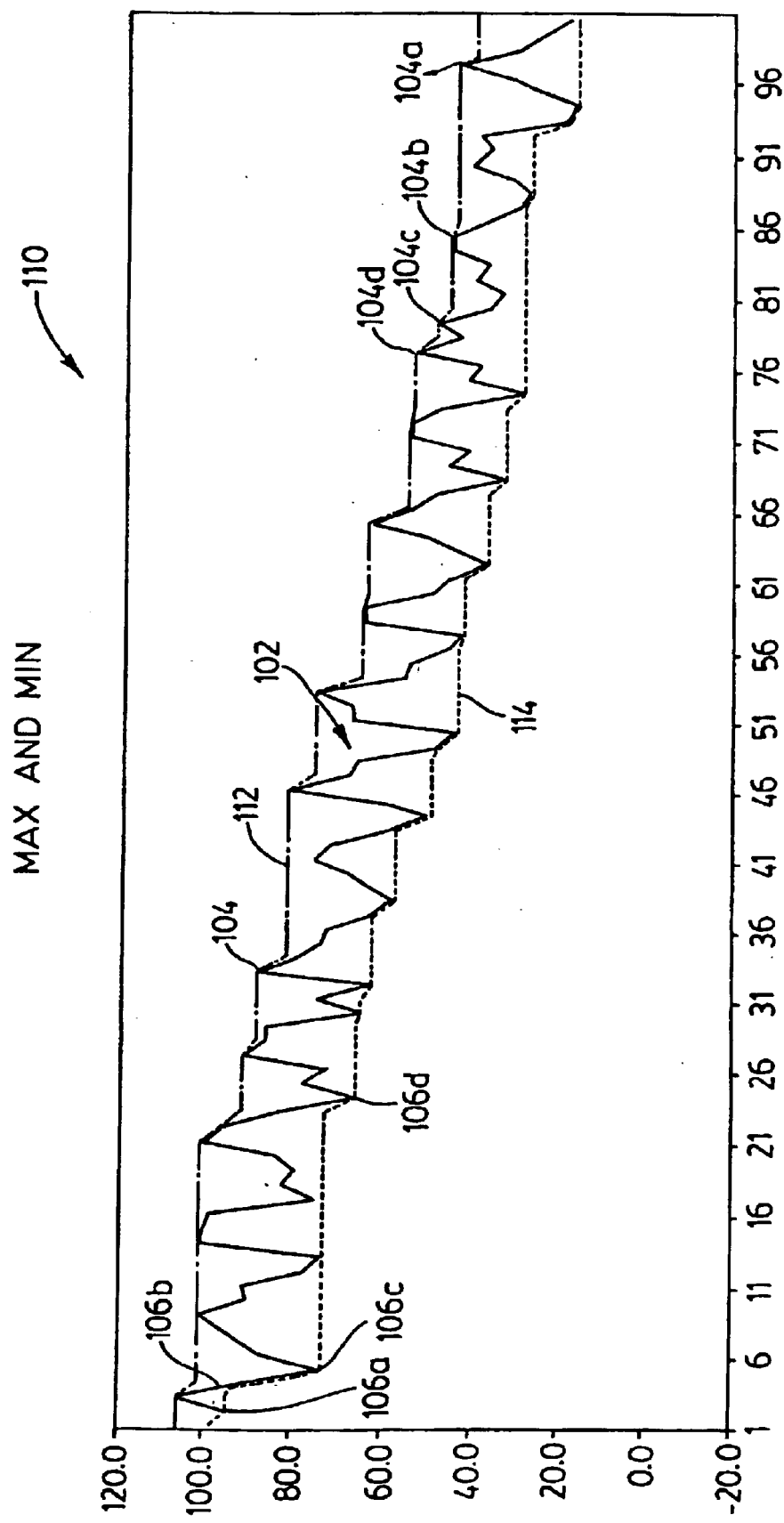
FIG. 3 shows a graph of the amplitude of the sampled receive signal over time.

Reference is now made to FIG. 3, which shows a graph 110 of the amplitude of the sampled receive signal 102 over time. Also shown in the graph 110 is a maximum signal profile 112 and a minimum signal profile 114. The maximum signal profile 112 follows the upper envelope of the sampled receive signal 102. Similarly, the minimum signal profile 114 follows the lower envelope of the sampled receive signal 102.

The maximum signal profile 112 may be generated beginning with a last peak 104a in the sampled receive signal 102. The amplitude of the maximum signal profile 112 is set at the value of the amplitude of the last peak 104a and maintains that amplitude until, moving backwards in time, the sampled receive signal 102 has an amplitude higher than the last peak 104a. This occurs at peak 104b in the sampled receive signal 102. Thereafter, the maximum signal profile 112 has an amplitude corresponding to the amplitude of peak 104b, which it maintains until peak 104c, and peak 104d, and so on. In this manner the maximum signal profile 112 traces the upper envelope of the sampled receive signal 102.

The minimum signal profile 114 may be generated beginning with a first 4trough 106a in the sampled receive signal 102. The amplitude of the minimum signal profile 114 is set at the value of the amplitude of the first trough 106a and maintains that amplitude until the sampled receive signal 102 dips below that amplitude, which it does at trough 106b. The minimum signal profile 114, therefore, traces the lower envelope of the sampled receive signal 102 connecting troughs 106a, 106b, 106c, 106d, and so on.

The task of generating of a maximum signal profile 112 and a minimum signal profile 114 is performed by the microprocessor 14 (FIG. 1). The microprocessor 14 (FIG. 1) may operate under the program control of firmware suitably programmed to implement the functions described above. The above-described embodiment generates the maximum and minimum signal profiles 112 and 114 using simple non-intensive computational steps, such as compares between a maximum (or minimum) value and the sampled receive signal 102 values. As the microprocessor 14 steps through the samples, it adjusts the maximum (or minimum) value whenever the sampled receive signal 102 exceeds it, thereby tracking the envelope of the sampled receive signal 102.

The generation of a maximum or minimum signal profile 112 and 114 may be performed using other envelope or peak detection steps. The profiles 112 and 114 may also be generated by other components, rather than the microprocessor 14, such as by dedicated digital circuitry coupled to the A/D converter 16. The profiles 112 and 114 may also be generated in analog form from the unsampled receive signal using analog circuitry to implement an envelope or peak detection circuit.

Figure 4:
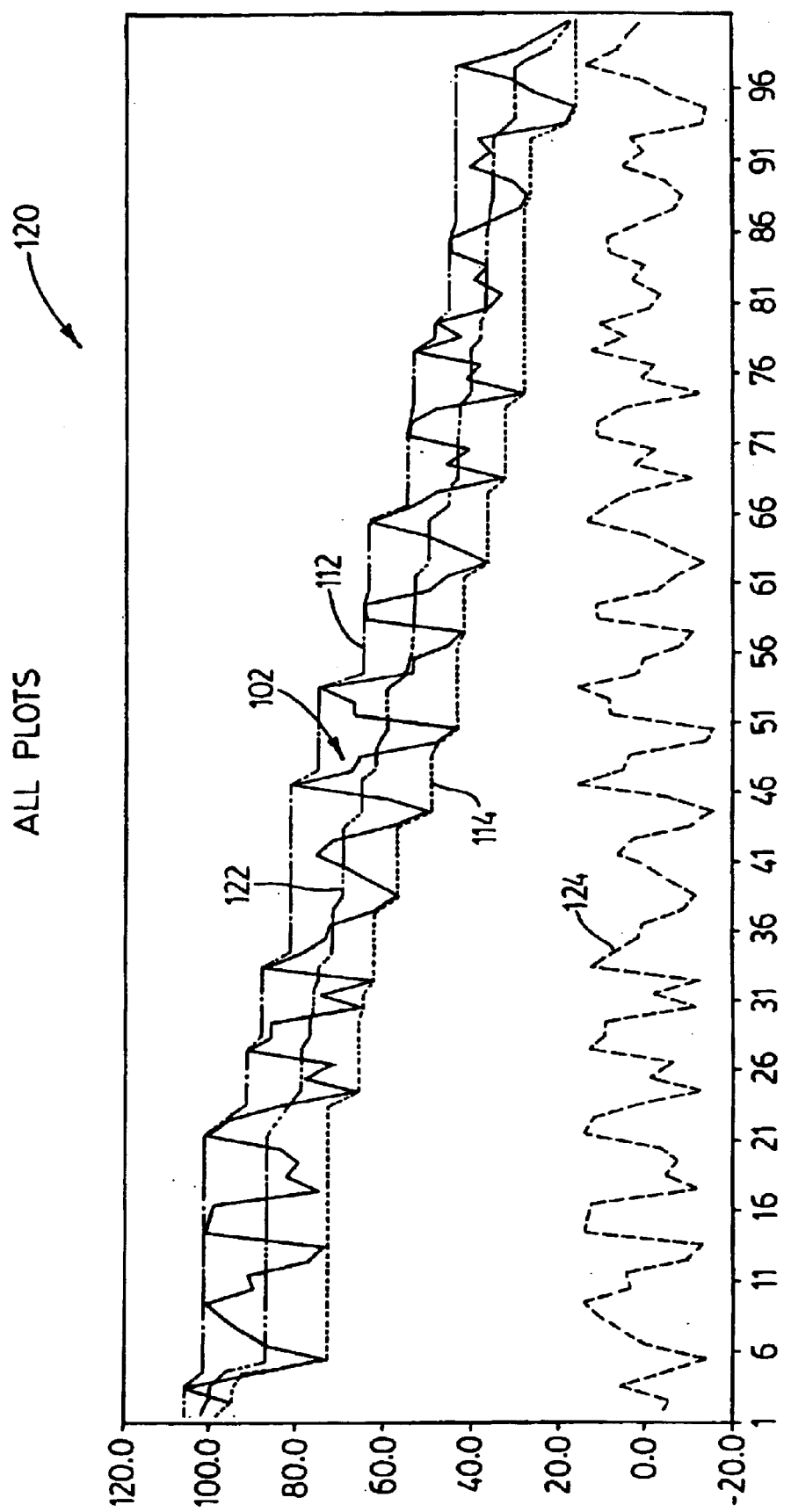
FIG. 4 shows a graph of amplitude of various plots generated from the sampled receive signal.

Reference is now made to FIG. 4, which shows a graph 120 of amplitude of various plots generated from the sampled receive signal 102. In addition to the sampled receive signal 102, the maximum signal profile 112, and the minimum signal profile 114, the graph 120 shows a midpoint reference signal 122. The midpoint reference signal 122 is generated as the average amplitude value of the maximum signal profile 112 and the minimum signal profile 114 on a point-by-point basis.

The midpoint reference signal 122 serves as a calculation of the offset by which the sampled receive signal 102 can be corrected so as to filter DC and low frequency components out. Accordingly, the graph 120 also shows a filtered signal 124. The filtered signal 124 is generated by subtracting the midpoint reference signal 122 from the sampled receive signal 102. The filtered signal 124 may then be processed for echo detection.

Like the generation of the maximum and minimum signal profiles 112 and 114, the generation of the midpoint reference signal 122 and the filtered signal 124 in the above-described embodiment is performed by the microprocessor 14 (FIG. 1) under firmware control. The calculation of the midpoint reference signal 122 is computationally straight forward in that the corresponding sample values of the maximum signal profile 112 and the minimum signal profile 114 are added together and the result is divided by two. In one embodiment, the division is implemented as a one-bit shift operation. The resulting average sample values constitute the midpoint reference signal 122.

The filtered signal 124 is then generated by subtracting each midpoint reference signal 122 sample value from its corresponding sampled receive signal 102 sample value. The resulting set of values constitutes the filtered signal 124.

As with the profiles 112 and 114, the averaging step to generate a midpoint reference signal 122 and the step of subtracting of the midpoint reference signal 122 from the sampled receive signal 102 may be implemented digitally by the microprocessor or other dedicated digital logic circuitry, or it may be performed prior to digitization using analog circuitry. The above-described functions may be carried out by the microprocessor 14 (FIG. 1) in response to a suitable set of program components, which may be implemented within firmware.

Figure 5:
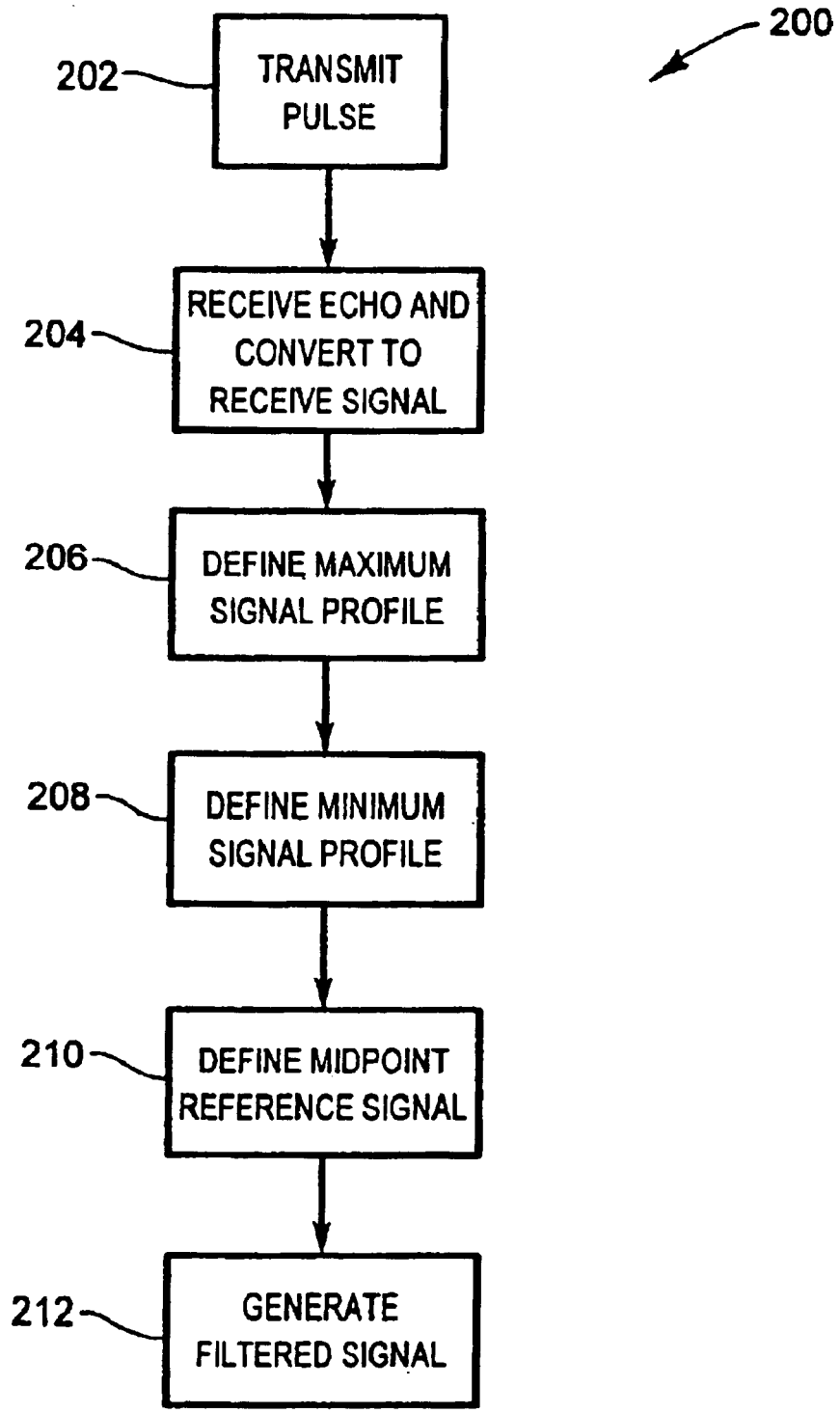
FIG. 5 shows a flowchart illustrating the steps of a method according to the present invention.

Reference is now made to FIG. 5, which shows a flowchart illustrating the steps of a method 200 according to the present invention. The method 200 begins in step 202 with the transmission of a pulse by a level measurement device towards a reflective surface. In step 204, an echo is received at the level measurement device and converted into a receive signal 102 (FIG. 4). The receive signal 102 may be digitized by an A/D converter (step not shown).

Once the receive signal 102 (FIG. 4) has been obtained in step 204, the microprocessor 14 (FIG. 1) determines a maximum signal profile 112 (FIG. 4) of the receive signal (step 206) and a minimum signal profile 114 (FIG. 4) of the receive signal 102 (step 208). Based upon the maximum signal profile 112 and the minimum signal profile 114, the microprocessor 14 then, in step 210, defines a midpoint reference signal 122 (FIG. 4) between the maximum and minimum signal profiles 112, 114. In step 212, the microprocessor 14 generates a filtered signal 124 (FIG. 4) by subtracting the midpoint reference signal 122 from the receive signal 102.

It will be apparent to those of ordinary skill in the art that some steps of the method 200 described above may be performed in another sequence. For example, step 210 may be performed prior to, or in parallel with, step 208.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for high-pass filtering for echo processing in a pulse echo level measurement system, said level measurement system having a transducer for transmitting pulses and receiving echoes and including a receiver for converting the received echoes into corresponding receive signals, said method comprising the steps of:
   (a) transmitting a transmit pulse to a reflective surface;
   (b) receiving an echo and converting the echo into a receive signal, said receive signal having a plurality of peaks and troughs;
   (c) defining a maximum signal profile, said maximum signal profile being an upper envelope of said receive signal;
   (d) defining a minimum signal profile, said minimum signal profile being a lower envelope of said receive signal;
   (e) defining a midpoint reference signal between said maximum signal profile and said minimum signal profile; and
   (f) subtracting said midpoint reference signal from said receive signal to generate a filtered signal,
   wherein said receive signal includes a sequence of samples, including a last sample, each of said samples having a magnitude, and wherein said step of defining a maximum signal profile includes setting the magnitude of said maximum signal profile equal to the magnitude of said last sample and, moving backwards in the sequence, comparing the magnitude of said maximum signal profile to the magnitude of each of said samples and setting said maximum signal profile to the magnitude of one of said samples if the magnitude of said one of said samples is greater than the magnitude of said maximum signal profile, thereby tracking the upper envelope of said receive signal.

2. The method claimed in claim 1, wherein said midpoint reference signal is halfway between said maximum signal profile and said minimum signal profile.

3. The method claimed in claim 2, wherein said step of defining a midpoint reference signal includes adding said minimum signal profile to said maximum signal profile to create a composite profile and dividing said composite profile by two to create said midpoint reference signal.

4. The method claimed in claim 1, wherein said sequence of samples includes a first sample and said step of defining a minimum signal profile includes setting the magnitude of said minimum signal profile equal to the magnitude of said first sample and, moving forwards in the sequence, comparing the magnitude of said minimum signal profile to the magnitude of each of said samples and setting said minimum signal profile to the magnitude of one of said samples if the magnitude of said one of said samples is less than the magnitude of said minimum signal profile, thereby tracking the lower envelope of said receive signal.

5. A pulse-echo acoustic ranging system comprising:
   (a) a transducer for emitting acoustic pulses and detecting reflected echoes;
   (b) a controller having a receiver component and a transmitter component;
   (c) said transducer having an input port operatively coupled to said transmitter component and being responsive to said transmitter component for emitting said acoustic pulses, and said transducer including an output port operatively coupled to said receiver component for outputting reflected echoes coupled by said transducer;
   (d) said receiver component converting said reflected acoustic pulses into a receive signal, said receive signal having a plurality of peaks and troughs;
   (e) said controller including a first program component for defining a maximum signal profile, said maximum signal profile being an upper envelope of said receive signal, a second program component for defining a minimum signal profile, said minimum signal profile being a lower envelope of said receive signal, a third program component for defining a midpoint reference signal between said maximum signal profile and said minimum signal profile, and a fourth program component for subtracting said midpoint reference signal from said receive signal to generate a filtered signal,
   wherein said receive signal includes a sequence of samples, including a last sample, each of said samples having a magnitude, and wherein said first program component includes a program component for setting the magnitude of said maximum signal profile equal to the magnitude of said last sample and, moving backwards in the sequence, comparing the magnitude of said maximum signal profile to the magnitude of each of said samples and setting said maximum signal profile to the magnitude of one of said samples if the magnitude of said one of said samples is greater than the magnitude of said maximum signal profile, thereby tracking the upper envelope of said receive signal.

6. The system claimed in claim 5, wherein said sequence of samples includes a first sample and said second program component includes a program component for setting the magnitude of said minimum signal profile equal to the magnitude of said first sample and, moving forwards in the sequence, comparing the magnitude of said minimum signal profile to the magnitude of each of said samples and setting said minimum signal profile to the magnitude of one of said samples if the magnitude of said one of said samples is less than the magnitude of said minimum signal profile, thereby tracking the lower envelope of said receive signal.

7. The system claimed in claim 5, wherein said midpoint reference signal is halfway between said maximum signal profile and said minimum signal profile.

8. The system claimed in claim 7, wherein said third program component includes a program component for adding said minimum signal profile to said maximum signal profile to create a composite profile and dividing said composite profile by two to create said midpoint reference signal.

9. A method for high-pass filtering for echo processing in a pulse echo level measurement system, said level measurement system having a transducer for transmitting pulses and receiving echoes and including a receiver for converting the received echoes into corresponding receive signals, said method comprising the steps of:
 (a) transmitting a transmit pulse to a reflective surface;
 (b) receiving an echo and converting the echo into a receive signal, said receive signal having a plurality of peaks and troughs;
 (c) defining a maximum signal profile, said maximum signal profile being an upper envelope of said receive signal;
 (d) defining a minimum signal profile, said minimum signal profile being a lower envelope of said receive signal;
 (e) defining a midpoint reference signal between said maximum signal profile and said minimum signal profile; and
 (f) subtracting said midpoint reference signal from said receive signal to generate a filtered signal,
 wherein said receive signal includes a sequence of samples including a first sample and said step of defining a minimum signal profile includes setting the magnitude of said minimum signal profile equal to the magnitude of said first sample and, moving forwards in the sequence, comparing the magnitude of said minimum signal profile to the magnitude of each of said samples and setting said minimum signal profile to the magnitude of one of said samples if the magnitude of said one of said samples is less than the magnitude of said minimum signal profile, thereby tracking the lower envelope of said receive signal.

10. A pulse-echo acoustic ranging system comprising:
 (a) a transducer for emitting acoustic pulses and detecting reflected echoes;
 (b) a controller having a receiver component and a transmitter component;
 (c) said transducer having an input port operatively coupled to said transmitter component and being responsive to said transmitter component for emitting said acoustic pulses, and said transducer including an output port operatively coupled to said receiver component for outputting reflected echoes coupled by said transducer;
 (d) said receiver component converting said reflected acoustic pulses into a receive signal, said receive signal having a plurality of peaks and troughs; and
 (e) said controller including a first program component for defining a maximum signal profile, said maximum signal profile being an upper envelope of said receive signal, a second program component for defining a minimum signal profile, said minimum signal profile being a lower envelope of said receive signal, a third program component for defining a midpoint reference signal between said maximum signal profile and said minimum signal profile, and a fourth program component for subtracting said midpoint reference signal from said receive signal to generate a filtered signal,
 wherein said receive signal includes a sequence of samples including a first sample and said second program component includes a program component for setting the magnitude of said minimum signal profile equal to the magnitude of said first sample and, moving forwards in the sequence, comparing the magnitude of said minimum signal profile to the magnitude of each of said samples and setting said minimum signal profile to the magnitude of one of said samples if the magnitude of said one of said samples is less than the magnitude of said minimum signal profile, thereby tracking the lower envelope of said receive signal.

* * * * *